United States Patent [19]

Koga et al.

[11] Patent Number: 5,080,574
[45] Date of Patent: Jan. 14, 1992

[54] ROTARY TYPE INJECTION MOLDING MACHINE

[75] Inventors: Kouhei Koga, Ueda; Tomoyoshi Kawanami, Munakata; Hidehiko Fukai, Nagano, all of Japan

[73] Assignee: Nissei ASB Machine Co., Ltd., Japan

[21] Appl. No.: 603,949

[22] Filed: Oct. 25, 1990

[30] Foreign Application Priority Data

Oct. 27, 1989 [JP] Japan .................. 1-280059

[51] Int. Cl.⁵ ............................................ B29C 49/06
[52] U.S. Cl. ................................. 425/526; 264/513; 264/537; 264/538; 425/533; 425/534; 425/540
[58] Field of Search ............... 425/526, 533, 534, 540; 264/513, 537, 538

[56] References Cited

U.S. PATENT DOCUMENTS

| | | | |
|---|---|---|---|
| 4,321,029 | 3/1982 | Aoki | 425/533 |
| 4,726,756 | 2/1988 | Aoki | 425/526 |
| 4,946,367 | 8/1990 | Nakamura | 425/526 |

FOREIGN PATENT DOCUMENTS 162424 11/1985 Japan .

Primary Examiner—Timothy Heitbrink
Attorney, Agent, or Firm—Ostrolenk, Faber, Gerb & Soffen

[57] ABSTRACT

The present invention relates to a rotary type injection molding machine including a base plate provided in its surface with a rotary disk having hold molds at three portions on the lower surface thereof and having required core insert holes bored at stop positions of the hold molds, a support post on a machine bed vertically movably supporting the base plate and the rotary disk in the central portion thereof, the support post being intermittently rotated together with the rotary disk, a vertical clamping device on the machine bed in which one of the stop positions of the hold molds serves as an injection molding section and a clamping plate having a core mold at the lower side thereof is connected by movable tie bars on opposite sides to be positioned upwardly of the base plate, and an injection mold secured to the machine bed of the injection molding section, the base plate being movably supported by the movable tie bars and linked to the clamping device, an upper portion of the support post being carried by the base plate.

3 Claims, 4 Drawing Sheets

ROTARY TYPE INJECTION MOLDING MACHINE

BACKGROUND OF THE INVENTION

1. Field of the Invention

This invention relates to a rotary type injection molding machine in which an injection-molded article is transported to other working sections by making use of vertical movement and lateral movement of a rotary disk.

2. Description of the Prior Art

In a conventional rotary type injection molding machine, a base plate having a rotary disk provided underside thereof is supported at three portions, and a drive device for the rotary disk is installed on a machine bed, as described in Japanese Patent Application Laid-Open (Kokai) No. 60(1985)-244,518.

In such a molding machine as described above, the base plate is supported at three points, and therefore, if there is present even a slight difference in level therebetween, the rotary disk as well as the base plate is inclined to greatly affect on the closure of the mold. Galling occurs in the mold.

SUMMARY OF THE INVENTION

This invention has been achieved in order to solve the aforementioned problem encountered in the prior art. It is an object of this invention to provide a rotary type injection molding machine in which the rotary disk as well as the base plate can be always maintained to be horizontal and even if the machine is used for a long period of time, galling does not occur in the mold.

For achieving the aforesaid object, this invention is characterized by comprising a base plate provided in its underside with a rotary disk having hold molds at three portions on the lower surface thereof and having required core insert holes bored at stop positions of said hold molds, a support post on a machine bed vertically movably supporting said base plate and said rotary disk in the central portion thereof, said support post being intermittently rotated together with said rotary disk, a vertical clamping device on the machine bed in which one of said stop positions of said hold molds serves as an injection molding section and a clamping plate having a core mold at the lower side thereof is connected by movable tie bars on opposite sides to be positioned upwardly of the base plate, and an injection mold secured to the machine bed of the injection molding section, said base plate being movably supported by said movable tie bars and linked to the clamping device, an upper portion of said support post being carried by said base plate.

According to a further feature of this invention, the clamping device comprises, on both sides of a fixed plate on the machine bed, a clamping cylinder having a tie bar as a piston, a lowering cylinder having a lowering rod connected to a clamping plate connected to a piston, and a shock absorber on the machine bed side for receiving slow-down shaft provided on the clamping plate parallel with said piston rod.

According to another feature of this invention, another two stop positions of the hold molds on the machine bed each serve as a molded article cooling section, and a cooling device is provided on the base plate and on the machine bed of each section.

With the aforementioned configuration, when the support post moves down, the base plate together with the rotary disk also moves down with the tie bar as a guide, and the hold mold and the injection mold are closed. The clamping plate is moved down as the lowering cylinder operates, the injection core is inserted into the cavity, and powerful clamping is carried out by the operation of the clamping cylinder.

When, after molding, the clamping plate is returned to its original position and the support post is moved upward, the rotary disk together with the base plate also moves upward, and mold-opening occurs whereby the molded article is removed by the hold mold from the cavity.

Thereafter, when the support post is rotated, the rotary disk together with the support post is rotated through a predetermined angle (120°) since the base plate is impaired in rotation by the tie bar, and the hold mold stops at the next cooling section. When, after stoppage, the support post is again moved down, the mold closing begins as mentioned above.

BRIEF DESCRIPTION OF THE DRAWINGS

The drawings show one embodiment of a rotary type injection molding machine according to this invention.

DETAILED DESCRIPTION OF THE PREFERRED EMBODIMENTS

Figure 1:
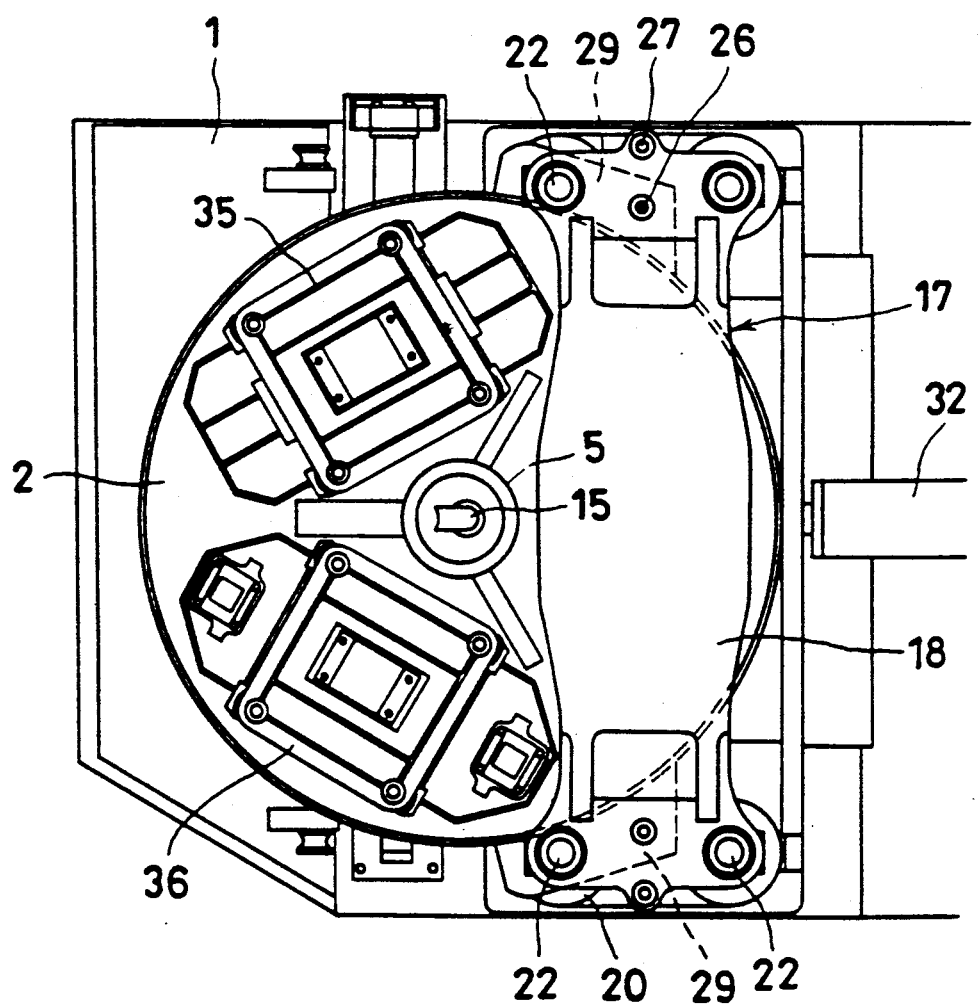
FIG. 1 is a plan view of the molding machine.

In the drawings, reference numeral 1 designates a machine bed; 2 a base plate above the machine bed; and 3 a rotary disk rotatably embraced on the underside of the base plate Z. The rotary disk 3 has a lip portion in the central portion thereof, and on the underside of openings formed at three portions of the surface of the rotary disk 3 are mounted a plurality of bold molds 4 which are radially opened and closed, said bold molds 4 being parallel with a tangential line.

The base plate 2 is integrally provided in its central portion with a cylindrical support portion 5 with a lower portion opened, and core insert holes 6 are bored at three portions at which said hold molds 4 stop.

Reference numeral 7 designates a support post vertically movably provided on the machine bed, and a piston rod 8a of a hydraulic cylinder 8 for vertical movement is connected to the lower end of the support post 7. In the lower periphery of the support post 7 is axially movably fitted a rotary cylinder 12 integrally provided with a pinion 11 meshed with a rack 10 of a reciprocating drive device (not shown) through a spline 9. A flange 13 is integrally provided in the periphery at the upper portion of the post. A carrying portion of cylindrical support portion 5 of the base plate 2 and a central portion of the rotary disk 3 are inserted into a post end 7a on the flange 13 to horizontally support both of them upwardly of the machine bed.

Bearings 14 are provided at upper and lower portions between the carrying portion of cylindrical support portion 5 and the post end 7a so as not to transmit rotation of the support post 7 to the base plate 2. The rotary disk 3 and the flange 13 are integrally connected by means of bolts so that they are rotated together with the support post 7 every 120°.

Interiorly of the post end 7a is provided a cooling passage 16 connected to a cooling pipe 15 connected to the top end of the carrying portion 5, the cooling passage 16 extending up to the flange end edge. Although not shown, a flexible pipe is connected to the hold mold 4 from the flange end edge so that the hold mold can be cooled to a predetermined temperature.

Figure 4:
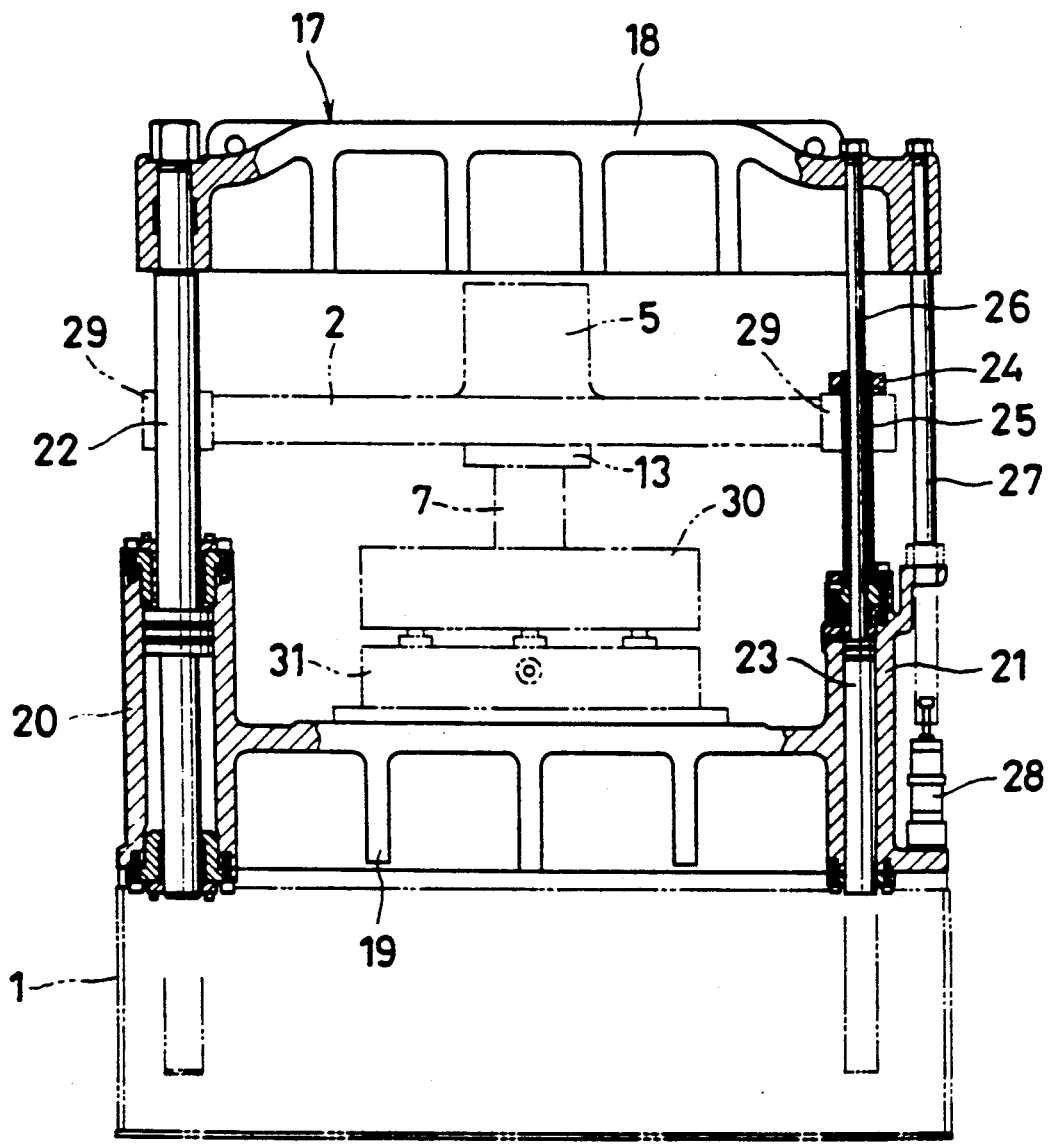
FIG. 4 is a longitudinal sectional front view of a clamping device.

Reference numeral 17 designates a vertical type clamping device, which is provided on the machine bed with one of stop positions of the hold molds 4 being an injection section. As shown in FIGS. 1 and 4, a clamping plate 18 is provided upwardly of the base plate so as to cross the base plate 2, and a fixed plate 19 is positioned on the machine bed.

A clamping cylinder 20 and a lowering cylinder 21 of the clamping plate 18 are juxtaposed on the opposite side of the fixed plate 19, and a tie bar 22 as a clamping piston connected to the clamping plate 18 is inserted into the clamping cylinder 20. A lowering rod 26 inserted into a restriction cylinder 25 having a stopper 24 at the upper end thereof and connected to the clamping plate 18 is connected to a piston 23 of the lowering cylinder 21, and the clamping plate 18 can be pulled down as the base plate 2 descends through the lowering rod 26.

Reference numeral 27 designates a slow-down shaft provided on the clamping plate parallel with the lowering rod 26, and the lower end of the slow-down shaft is received by a shock absorber 28 on the machine bed side to slow-down the clamping speed.

A member 29 on the side of the base plate 2 is movably inserted into the tie bar 22 internally of the clamping device 17 and the restriction cylinder 25, as shown in FIGS. 1 and 4. The linkage between the base plate 2 and the clamping device 17 causes the base plate 2 to carry the upper portion of the support post 5, and the raising of the base plate 2 resulting from reaction when the core is released is prevented by the stopper 24 of the restriction cylinder 25.

Figure 2:
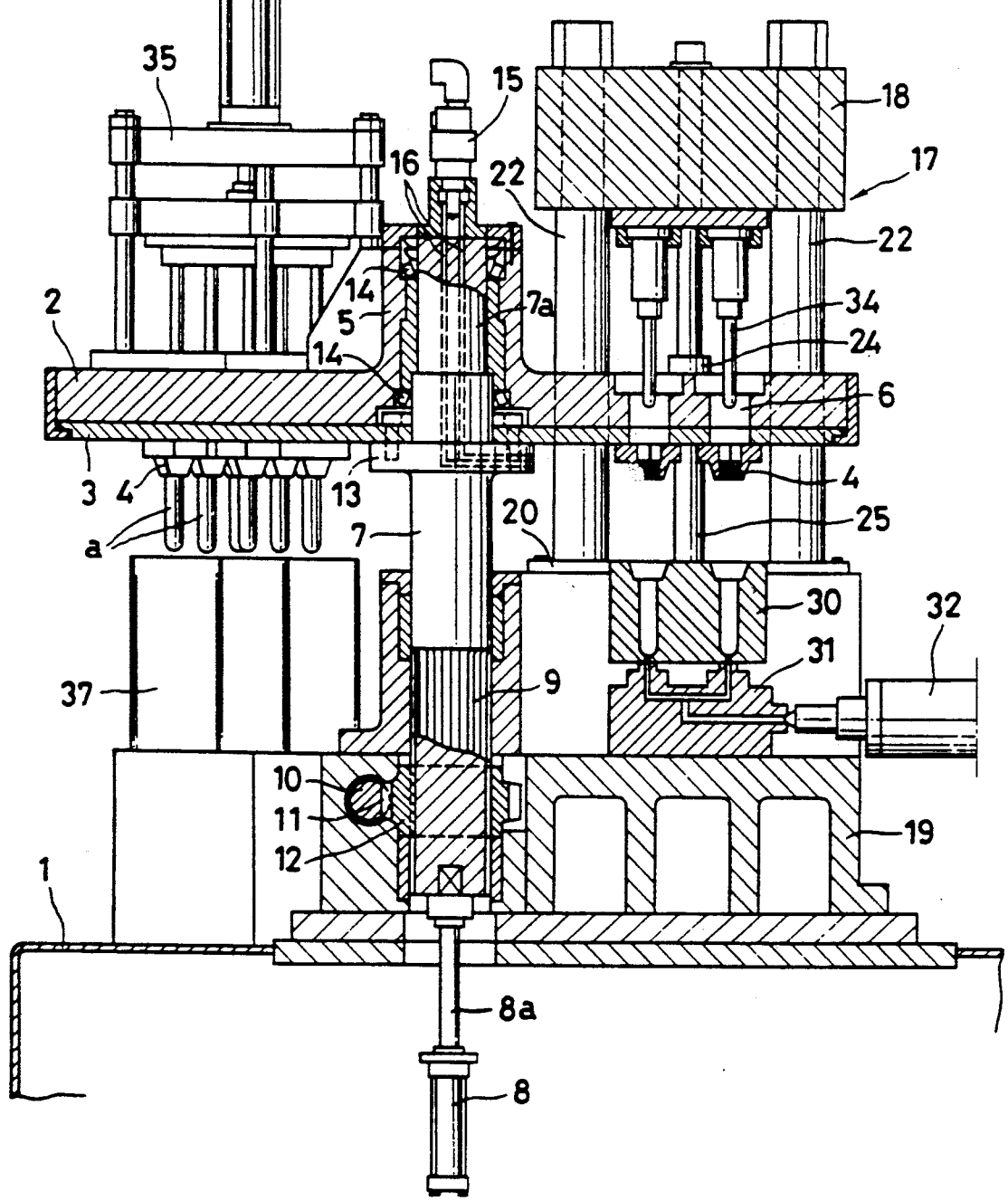
FIG. 2 is a longitudinal sectional view when the mold is opened.

Reference numeral 30 designates an injection mold, which together with a hot runner block 31, is placed on and secured to the fixed plate 19 as shown in FIG. 2, and an injection apparatus 32 is in nozzle touch with a gate of the hot runner block 31. An upper portion of the cavity of the injection mold 30 is opened, and the hold mold is fitted into the opening, and an injection core 34 mounted on the underside of the clamping plate 18 extending through the hold mold 4 is positioned within the cavity.

Figure 3:
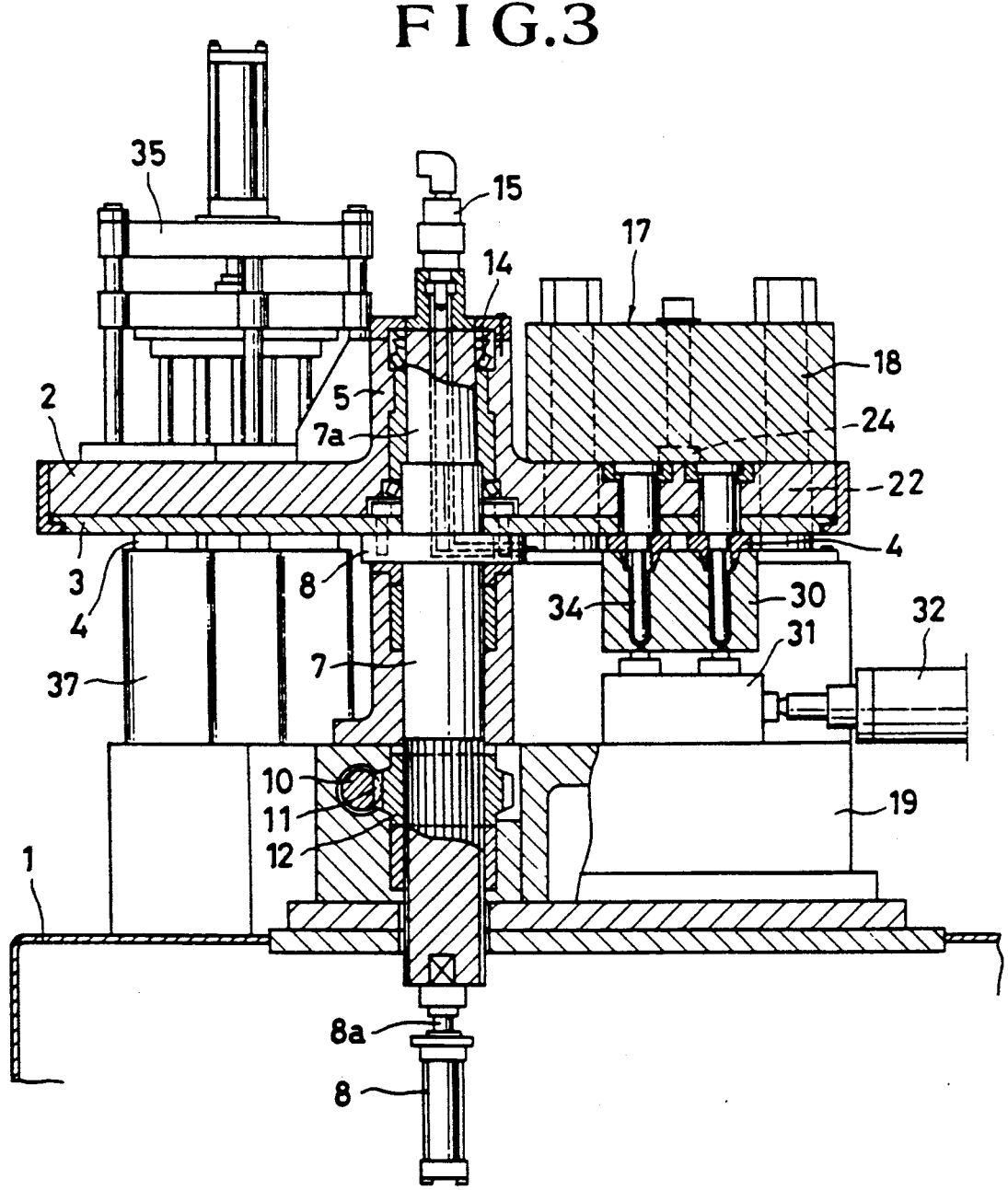
FIG. 3 is a longitudinal sectional view when the mold is closed.

Other two stop positions of the hold mold 4 are utilized as an molded-article cooling section, and on the base plate at that position is installed a cooling device 35 and a cooling device 36 capable of removing the molded article, as shown in FIG. 1. Also, on the machine bed at the lower side of said position of the base plate 2 is installed a pot-like cooling device 37 for receiving a molded article, for example, a bottomed preform a, held on the hold mold 4 so that the preform a can be received into the cooling device 37 from the upper opening by downward movement of the base plate 2. Accordingly, the preform a having been transported sequentially to these positions while the lip thereof being held by the hold mold 4 is to be rapidly cooled during the injection molding shown in FIG. 3.

As described above, according to the present invention, the central portion of the base plate together with the rotary disk are carried on the support post on the machine bed, the base plate being vertically movably supported on the tie bar of the clamping device, the rotary disk being connected to the support post, and only the rotary disk together with the support post is rotated through a predermined angle. Therefore, the base plate can be always maintained horizontally, and even if the apparatus is used for a long period of time, closing of the hold molds and injection molds are not impaired due to the inclination and no galling occurs.

Furthermore, the clamping device comprises, on both sides of the fixed plate on the machine bed, a clamping cylinder with a tie bar as a piston, a core insert cylinder in which a lowering rod connected to the clamping plate is connected to a piston, and a shock absorber on the machine bed side for receiving a slow-down shaft juxtaposed to the lowering rod and provided on the clamping plate. Therefore, the downward movement of the clamping plate can follow the downward movement of the base plate by the support post without delay, and the slow-down can be effected immediately before clamping. Therefore, closing of mold can be also carried out without restriction.

Moreover, there are another merits such that the injection-molded articles can be cooled at the other stop positions, and therefore, the molding cycle is shortened, and molding of the preform used for orientation blow molding of containers can be carried out at high speeds.

What is claimed is:

1. A injection molding machine, comprising a base plate, a rotary disk located on a lower surface of said base plate, said rotary disk having hold molds at three portions on the lower surface and having core insert holes bored at stop positions of said hold molds, one of said stop positions of said hold molds being an injection molding section, a support post located on a machine bed for vertically movably supporting said base plate and said rotary disk in a central portion thereof, said support post being intermittently rotatable together with said rotary disk, a vertical clamping device located on the machine bed and associated with said injection molding section, the device including a clamping plate having a core mold at a lower side thereof, the clamping plate being connected to movable tie bars located on opposite sides of the clamping plate for positioning the clamping plate upwardly of the base plate, and an injection mold secured to the machine bed at the stop position of the injection molding section, said base plate being movably supported by said movable tie bars and linked to the clamping device, and an upper portion of said support post being carried by said base plate.

2. The injection molding machine according to claim 1, wherein the clamping device comprises a fixed plate located on the machine bed, a clamping cylinder connected to the fixed plate, said clamping cylinder including a tie bar for a piston, a lowering cylinder including a lowering rod connected at one end to the clamping plate and at another end to a piston, and a shock absorber for receiving a slow-down shaft juxtaposed to the lowering rod and provided on the clamping plate.

3. The injection molding machine according to claim 1, further comprising two additional stop positions for the hold molds located on the machine bed for a molded article cooling section and a mold article cooling and removing section, and cooling devices located on the base plate and on the machine bed for each of the molded article cooling and molded article cooling and removing sections.

* * * * *